United States Patent
Werner et al.

(10) Patent No.: US 10,668,417 B2
(45) Date of Patent: Jun. 2, 2020

(54) DEVICE HAVING A FILTER LAYER AND METHOD FOR EXTRACTING NUCLEIC ACIDS FROM FORMALIN-FIXED AND PARAFFIN-EMBEDDED SAMPLES

(71) Applicant: AXAGARIUS GMBH & CO. KG, Düren (DE)

(72) Inventors: Florian Werner, Langerwehe (DE); Stefan Heymans, Solingen (DE); Thomas Zinn, Düren (DE)

(73) Assignee: AXAGARIUS GMBH & CO. KG (GB)

( * ) Notice: Subject to any disclaimer, the term of this patent is extended or adjusted under 35 U.S.C. 154(b) by 623 days.

(21) Appl. No.: 14/963,762

(22) Filed: Dec. 9, 2015

(65) Prior Publication Data

US 2016/0168562 A1 Jun. 16, 2016

(30) Foreign Application Priority Data

Dec. 12, 2014 (DE) ........................ 10 2014 118 532

(51) Int. Cl.
*B01D 39/16* (2006.01)
*B01L 3/00* (2006.01)
*G01N 1/36* (2006.01)

(52) U.S. Cl.
CPC .......... *B01D 39/16* (2013.01); *B01L 3/50255* (2013.01); *B01L 2200/0631* (2013.01); *B01L 2300/0829* (2013.01); *B01L 2400/0409* (2013.01); *G01N 1/36* (2013.01)

(58) Field of Classification Search
CPC . C12Q 1/68; G01N 1/30; G01N 33/48; B01L 3/50255
See application file for complete search history.

(56) References Cited

U.S. PATENT DOCUMENTS

| | | | |
|---|---|---|---|
| 6,117,394 A | 9/2000 | Smith | |
| 7,825,046 B2 | 11/2010 | Hatfield et al. | |
| 8,008,475 B1* | 8/2011 | Bastian | C12Q 1/6806 210/650 |
| 2002/0127587 A1* | 9/2002 | Simms | B01D 39/18 435/6.12 |
| 2008/0102493 A1* | 5/2008 | Ongena | C12N 15/1017 435/91.1 |
| 2009/0325269 A1* | 12/2009 | Marschke | B01D 61/147 435/235.1 |
| 2010/0288579 A1* | 11/2010 | Gerkinsmeyer | H04R 7/10 181/169 |
| 2011/0003369 A1 | 1/2011 | Kirsch et al. | |

FOREIGN PATENT DOCUMENTS

| | | |
|---|---|---|
| DE | 102009003524 A1 | 10/2009 |
| DE | 102009031434 A1 | 1/2011 |
| EP | 1242594 A1 | 9/2002 |
| EP | 2270151 A1 | 1/2011 |
| WO | WO-0146402 A1 | 6/2001 |
| WO | WO-2013083260 A1 | 6/2013 |
| WO | WO-2014078650 A1 | 5/2014 |

OTHER PUBLICATIONS

AATCC Test Method 118, "Oil Recovery: Hydrocarbon Resistance Test", AATCC Technical Manual/2000, (1997), pp. 191-193.
ASTM D737-04, "Standard Test Method for Air Permeability of Textile Fabrics", ASTM International, (2014).
ASTM D751-06, "Standard Test Methods for Coated Fabrics", ASTM International, (2011).
Bohmann, K., et al., "RNA Extraction from Archival Formalin-Fixed Paraffin-Embedded Tissue: A Comparison of Manual, Semiautomated, and Fully Automated Purification Methods", Clinical Chemsitry, vol. 55, No. 9, (2009), pp. 1719-1727.
DIN 66 133, "Determination of pore volume distribution and specific surface area of solids by mercury intrusion", German Institue for Standardization, Jun. 1993.
DIN EN 1822-3, "High efficiency air filters (EPA, HEPA and ULPA)—Part 3: Testing flat sheet filter media", German Institute of Standardization, Jan. 2011.
Hennig, G., et al., "Automated Extraction of DNA and RNA from a Single Formalin-Fixed Paraffin-Embedded Tissue Section for Analysis of Both Single-Nucleotide Polymorphisms and mRNA Expression", Clinical Chemistry, vol. 56, No. 12, (2010), pp. 1845-1853.
Ribeiro-Silva, A., et al., "RNA extraction from ten year old formalin-fixed paraffin-embedded breast cancer samples: a comparison of column purification and magnetic bead-based technologies", BMC Molecular Biology, vol. 8, No. 118, (2007), pp. 1471-2199.

\* cited by examiner

*Primary Examiner* — Narayan K Bhat
(74) *Attorney, Agent, or Firm* — Faegre Drinker Biddle & Reath LLP

(57) ABSTRACT

The invention relates to a device for extracting nucleic acid from a formalin-fixed and paraffin-embedded sample comprising a hollow body having an inlet port and an outlet port and a filter layer arranged within the hollow body, wherein the device is characterized in that the filter layer has an oil repellency of at least grade 5 according to the test method by AATCC-118 (1997). The invention further relates to a method for extracting nucleic acids from a formalin-fixed and paraffin-embedded sample, and a kit comprising the inventive device.

9 Claims, 6 Drawing Sheets

DEVICE HAVING A FILTER LAYER AND METHOD FOR EXTRACTING NUCLEIC ACIDS FROM FORMALIN-FIXED AND PARAFFIN-EMBEDDED SAMPLES

CROSS-REFERENCE TO RELATED APPLICATIONS

This application claims priority to German Application No. 102014118532.3, filed Dec. 12, 2014, which is incorporated herein by reference in its entirety.

BACKGROUND OF THE INVENTION

The invention relates to a device for purifying nucleic acids from a formalin-fixed and paraffin-embedded sample comprising a hollow body having a sample inlet port and an outlet port and a filter layer arranged within the hollow body.

In the context of the histopathological examinations of biopsy material, formalin fixation with subsequent paraffin embedding is a procedure that has been known for many years. Morphological changes in such samples are largely excluded. This technique therefore presents an opportunity for permanent preservation of tissue samples. This method is also used in the medical field in the context of cancer disease, where a purely morphological characterization of the tissue samples is often insufficient to identify an ideal treatment method. In this context, a genetic analysis of the material is becoming increasingly important.

A fixed sample is presently understood to mean a biological sample, which is preserved by methods known per se, for example, using a formaldehyde solution. To further improve stability during storage, these samples are then placed in paraffin. Samples treated with formalin and embedded in paraffin are also referred to as FFPE tissues ("formalin-fixed, paraffin-embedded"). The sample fixed and embedded by this method can be used, for example, for histopathological examinations and/or subsequently stored over a very long period without any appreciable changes occurring in the biomolecules contained in these samples. In particular, even after longer periods, nucleic acids, i.e. RNA and DNA, can still be extracted from these samples.

The extraction of these biomolecules from such fixed, paraffin-embedded biological samples is, however, laborious because the samples must first be liberated from the paraffin they are surrounded by. The samples are usually thin sections in which the paraffin portion is generally in significant excess of the sample portion. Because the paraffin can interfere with, or completely prevent, further sample preparation and isolation of the biomolecules, different preparation methods are proposed in the state of the art by means of which the paraffin can be separated.

In light of the currently already very large and ever-expanding FFPE-libraries, methods that allow manual extraction on a small-scale only are hardly suitable to efficiently utilize the libraries in retrospective studies. In order to avoid a selection bias of the results as far as possible, it is necessary in this context to develop a method, which is completely automated to the highest extent possible and thereby reduces manual labor time to a minimum. Only in this way can sample throughput be substantially increased.

For throughput of large numbers of samples, however, the methods known to date, which can be performed only with large amounts of hazardous substances, are not suitable.

In general, for sample analysis with molecular biology methods, a small portion of the total embedded biopsy material must be treated in a special way. This involves first removing the paraffin and dissolving the samples in order to release the nucleic acids.

De-paraffinization of biological samples is known, for example, from EP 1 242 594. Paraffin is removed by repeated washing of the paraffin-embedded samples first with organic solvents such as, for example, xylene. Then, alcohol is used to remove the solvent and rehydrate the tissue. To this end, the sample is washed several times in succession, centrifuged, and the wash solutions lastly removed from the reaction tube by pipetting. In conventional automated liquid-handling pipetting devices, centrifugation steps can be implemented only with considerable effort and with the use of special automation-adapted centrifuges. In addition, pipette tips can become clogged by sample- and/or tissue residues during removal of the wash solutions by pipetting. This can lead to uncontrolled and incomplete liquid removal. Potentially remaining alcohol from the final wash steps can further interfere with subsequent enzymatic sample lysis.

Other methods are known from the state of the art that do not require aromatic solvents, such as xylene. Such procedures are described, for example, in Bohmann K et al 2009: RNA Extraction from Archival Formalin-Fixed Paraffin-Embedded Tissue: A Comparison of Manual, Semiautomated, and Fully Automated Purification Methods. Clinical Chemistry 55 (9) and in Hennig G 2010: Automated Extraction of DNA and RNA from a Single Formalin-Fixed Paraffin-Embedded Tissue Section for Analysis of Both Single-Nucleotide Polymorphisms and mRNA Expression. Clinical Chemistry 56 (12).

Bohmann et al and Hennig et al describe dissolving paraffin by heat incubation at 80° C. with simultaneous lysis of tissue sample in an aqueous solution. Following cooling of the solution to 65° C., the paraffin deposits onto the wall of the tube, and the residual tissue is removed by precipitation by means of magnetic particles (beads). Disadvantages of this method are the required incubation steps at elevated temperatures (80° C. and 65° C.) that can lead to degradation of RNA target molecules in particular. In addition, the use of magnetic beads for separation of the tissue samples leads to the risk of incomplete separation of non-lysed sample residues and potentially of the magnetic beads. This brings the risk that these components are carried-over in the subsequent purification procedure. In particular, non-lysed tissue fragments can cause clogging of pipette tips and impede further purification. With this procedure, the separation of paraffin is not controlled because of its deposition onto the wall of the tube.

Another method is known from Ribeiro-Silva A. et al 2007: RNA extraction from ten-year-old formalin-fixed paraffin-embedded breast cancer samples: a comparison of column purification and magnetic bead-based technologies. BMC Molecular Biology 2 (8:118). In the method described there, the use of toxic xylene can be omitted; however, repeated washing of the sample, for example, with limonene is also required to remove the paraffin, and the sample must subsequently be rehydrated using alcohol. During removal of the wash solutions from the sample tube, the sample can again clog the pipette tip, which is also accompanied by a loss of sample material.

A further method for processing FFPE-samples is known from WO 2014/078650 A1. In this method, the paraffin is emulsified to particle sizes in the range of 10 μm by means of focused ultrasound, and the tissue components located on the opposite the side of the liquid are also removed. The use of solvents is thereby omitted. The samples are subsequently centrifuged in order to separate the emulsified paraffin from the sample. This method cannot exclude sample loss either. In addition, the method is not automatable. Potential residues of remaining paraffin can have a negative effect on binding to the purification matrix used. Emulsification of 96 samples requires an hour alone, according to the manufacturer's specifications (Covaris, truXTRAC).

In DE 10 2009 031434 A1 a method for de-paraffinization of biological samples is described in which an inert, non-hydromiscible and non-toxic solvent is used to remove the paraffin. This method can be used for single purifications. For high-throughput procedures, however, several centrifugation steps for phase separation are included that are difficult to automate.

WO2013/083260A1 describes a filter column for separating the phases of a mixture of a lysed sample from paraffin dissolved in suitable solvents, where the lysed sample and the solvent are not miscible. A conceivable disadvantage of this method is that potentially non-lysed sample components may clog the pipette tips during transfer of the lysate- and paraffin/solvent mixture to a filter column. In addition, centrifugation steps to achieve phase separation are required in this method as well. The application of a pressure gradient, for example, by means of a vacuum chamber is not described. Therefore, this method is automatable only to a limited extent due to resulting technical limitations.

BRIEF SUMMARY OF THE INVENTION

The object of the present invention was therefore to provide a device for extracting nucleic acids from formalin-fixed and paraffin-embedded samples that can be automated with little effort, is less susceptible to interferences and allows quantitative isolation of sample material to the highest extent possible with as complete as possible separation of the paraffin from non-lysed sample components. A further object is to provide a corresponding method for extracting nucleic acids from formalin-fixed and paraffin-embedded samples.

This object is solved by a device for extracting nucleic acid from a formalin-fixed and paraffin-embedded (FFPE) sample comprising a hollow body having an inlet port and an outlet port and a filter layer arranged within the hollow body, wherein the device is characterized in that the filter layer has an oil repellency according to the test method by AATCC-118 (1997) of at least grade 5, in particular of at least grade 6, grade 7 or even of at least grade 8.

DETAILED DESCRIPTION OF THE INVENTION

The present invention is based on the knowledge that by use of a filter layer defined according to the invention a FFPE sample can first be freed from paraffin and lysed in a subsequent step in one and the same device. The special design of the filter layer thereby prevents both the organic solvent used to remove the paraffin and the aqueous lysis buffer typically used for lysing a biological sample from passing through the filter layer without application of a pressure gradient. Hence, the FFPE sample can first be treated with the organic solvent, optionally under slightly elevated temperatures, in order to dissolve the paraffin. The paraffin that is then contained in the solvent can then be removed and discarded by applying a pressure gradient, typically by applying vacuum at the outlet port of the device.

The paraffin-free sample is then retained on the filter layer, and washing of the sample, for example, with alcohol, is generally not strictly required but can be performed if so desired. In the next step, a lysis buffer and optionally a protease is then introduced into the device and the paraffin-free organic sample lysed in order to release the nucleic acid components. This step also can be optionally performed at slightly elevated temperatures, as is known per se to the skilled person concerned with sample lysis. After sample lysis is completed, the nucleic acids are then contained in the liquid phase of the lysis buffer. This liquid phase can then in turn be drawn through the filter layer and collected by applying a pressure gradient, typically by applying vacuum to the output port. All of the insoluble sample components are thereby retained on the filter layer, so that during the further processing of the nucleic acid-containing solution sample residue are no longer present that could cause clogging of pipetting instrumentation.

It is therefore a further object of the present invention to provide a method for isolating nucleic acids from formalin-fixed and paraffin-embedded samples by means of an inventive device, wherein the method includes the following steps:

a) Introducing a formalin-fixed and paraffin-embedded sample into the device through the inlet port of the device.

b) Covering the sample with an organic solvent optionally pre-heated to 60° C. and dissolving the paraffin in the organic solvent;

c) Optionally heating to a temperature of between 35 to 70° C.;

d) Passing the organic solvent and the paraffin dissolved therein through the filter layer in the direction of the outlet port of the device;

e) Introducing a solution containing at least one lysis agent through the inlet port of the device to the paraffin-purified sample following step d) and incubating, in particular at a temperature of between 25 to 100° C., for a time period of between 20 minutes to 16 hours;

f) Passing the solution containing the lysis agent and the lysed sample through the filter layer in the direction of the outlet port of the device and collecting said solution;

g) Optionally adding a nucleophilic agent that dissolves the cross-linking that occurred by formalin fixation and subsequent incubation for 30-60 min at 25 to 100° C., in particular at 80 to 95° C.;

h) Optionally adding chaotropic salt solutions and alcohol to bind the lysed sample to either silicon membranes or to magnetic particles, and subsequent purification of the DNA using procedures known per se or precipitation of the nucleic acids by alcohol.

With the inventive device and the method according to the invention, it is thus possible to almost completely liberate FFPE samples from paraffin whereby a loss of sample material can practically be excluded. In addition, problematic chemical waste can be further reduced by the inventive solution. Finally, the inventive device, and/or the inventive method, is suitable for full automation, so that a substantially higher sample throughput can be achieved than with the previous solutions known from the state of the art.

With the aid of the inventive method, in principle any types of biomolecules can be isolated from biological samples. They are then usually contained in the aqueous lysis solution and can be separated by methods known per se. To this end, the biomolecules to be isolated may, for example, be bound to a solid support. Silica membranes or loose silica particles, polymer-, glass- or magnetic beads can generally be employed for this purpose. For this step, the aqueous phase can either be removed from the collection tube used in step f) and applied to the solid phase, whereby suitable binding conditions may need to be adjusted. This can be accomplished, for example, by addition of a chaotropic salt, and/of one or several alcohols having one to four carbon atoms, such as in particular ethanol or isopropanol, to the aqueous phase.

Alternatively, the solid carrier, for example, in form of magnetic beads, can be added to the aqueous solution of lysed sample and lysis agent, whereby in this case too the binding conditions may be improved by the addition of chaotropic salts and/or the aforementioned alcohols, depending on the surface structure of the beads. The biomolecules then bind to the solid support and can subsequently be separated.

The isolation of the biomolecules from the aqueous phase, however, does not necessarily require the presence of a solid phase. Nucleic acids can, for example, be precipitated or extracted from the aqueous phase by methods known per se.

Biomolecules in the context of the present invention are, for example, nucleic acids and/or proteins. Nucleic acids can be RNA and DNA of different chain lengths, in particular with more than fifteen nucleotides, such as single- and double-stranded bacterial-, viral-, human-, animal-, or plant RNA or DNA, in particular genomic DNA, mitochondrial DNA, plasmids, mRNA, tRNA, rRNA, miRNA and other short RNA species, in particular having a chain length of between 15 to 25 nucleotides. All of the aforementioned biomolecules can be isolated individually or in any combination by the inventive method. Samples are in the form, for example, of thin sections of biological samples embedded in paraffin, as they may be obtained using a microtome.

The organic solvent used to dissolve the paraffin is generally a solvent that is not miscible with water; it is to be understood as a solvent that forms two separate phases at 25° C. in a 1:1 mixture with water. The solvents used in the context of the present invention should in addition advantageously exhibit good solubility properties relative to the paraffin commonly used to embed biological samples. For example, at least 1mg paraffin dissolves in 500 μL of the solvent at 25° C. or, in other words, to dissolve 1 mg of paraffin at 25° C. an amount of solvent of no more than 500 μL should be required, preferably no more than 300 μL, particularly preferably no more than 150 μL.

A lysis agent within the meaning of the present invention is to be understood as a compound that is capable of liberating biomolecules from the biological sample material. It can consist of one or more enzymes, for example, proteases.

One or more chaotropic salts can also be used as a lysis agent. To this end, especially considered are guanidinium salts, such as guanidinium thiocyanate or guanidinium hydrochloride, sodium- or potassium thiocyanate, potassium iodide, perchlorates or barium salts.

Other lysis-promoting agents, for example, detergents such as sodium lauryl sulfate (SDS) can also be used within the meaning of the invention.

The aforementioned lysis agents, i.e., for example, enzymes or chaotropic salts, or detergents, may be used alternatively or in any combination. It is provided according to the invention that the lysis agent is already present in the form of an aqueous solution or that by addition of water and lysis agent an aqueous solution is formed in-situ. In both cases an aqueous phase thereby forms.

Provided that, within the context of the inventive method, both enzymes as well as chaotropic salts are employed, it is practical to first add the enzyme(s) and if desired a small amount of chaotropic salt, followed by incubation. In a second step, the concentration of the chaotropic salt can then be increased to the desired level, or if only enzyme is initially added, the entire amount of chaotropic salt is added in this step. This applies in both the case where aqueous solutions of these agents are employed as well in the case where water and solid lysis agents are used. In this way, a potential reduction of the activity of the enzyme(s) by a chaotropic salt concentration that is initially too high can be prevented.

Since the biological samples had been fixed by means of a formalin solution, it is advantageous that following step f) an agent is used that supports the removal of the formalin treatment-induced crosslinking, such as, for example, high molar ammonium salt solutions and/or alkyl amines.

Further agents other than the lysis agent and/or the chaotropic salt can be added to the solution used in step e), such as, for example, at least one buffer agent and/or at least an alcohol having 1 to 4 carbon atoms.

Suitable buffer agents are, for example, Tris/HCl, phosphate buffer, borate buffer, PBS-buffer, citrate buffer, MES-buffer or HEPES buffer. Alcohols having 1 to 4 carbon atoms are, for example, methanol, ethanol, n-/iso-propanol, butanols and/or mixtures of said alcohols. DTT, beta-mercaptoethanol, TCEP, or other reducing agents can be employed as reducing agents.

In the context of the present invention, the filter layer may comprise a filter membrane and/or a filter frit. The membrane is preferably composed of polyethersulfone, polytetrafluoroethylene, polyethyleneterephthalate or of acrylate polymers. The filter frit is composed, for example, of sintered polyethylene or polytetrafluoroethylene. The mean pore size of the filter membrane and the filter frit is, according to DIN 66133, in particular less than 20 μm, preferably between 0.05 to 15 μm, particularly preferably between 0.1 to 10 μm. The aforementioned filter layers may be combined with each other in any form.

It is further particularly preferred that independently of each other the filter membrane and the filter frit comprise a surface coating of fluorocarbons and/or fluorosilanes. This is particularly advantageous because the inventive minimum values of oil repellency according to AATCC 118 (1997) can be achieved in a simple manner.

The filter membrane and/or the filter frit have an oil repellency according to the AATCC-118 (1997) test method of at least grade 5, in particular of at least grade 6, preferably of grade 6 to grade 8.

The aforementioned embodiments are advantageous because the specified pore size or the retention ability ensures that possible particulate components, which could lead to clogging of pipetting devices, are mechanically retained. The filter layer simultaneously exhibits a fluid permeability allowing rapid flow of the aqueous phase through the filter layer only when a pressure gradient is applied, for example, by creating negative pressure or, if desired, by centrifugation. Without the pressure gradient both aqueous- and organic fluids are retained and unwanted dripping through the filter layer is prevented. This, for example, prolongs the reaction time of a lysis buffer with a tissue sample, which is apparent in terms of an advantageous nucleic acid yield. The same also applies with respect to the time during which a paraffin dissolver can react with the paraffin-embedded sample.

The filter membrane has a thickness, for example, of between 75 μm to 250 μm. Typical thickness of the filter frits are between 0.5 mm to 3 mm.

To provide mechanical support, the filter layer may comprise a fluid-permeable support plate, in particular a frit. For this purpose, a frit, for example, constructed of sintered polyethylene or polytetrafluoroethylene may be employed. The support plate is typically arranged on the side of the filter membrane or filter frit that faces the outlet port. If more than one filter membrane or filter frit is used, the support plate forms the bottom layer of the filter layer, i.e. it is arranged facing the direction of the outlet port. The support plate has, for example, a thickness of between 0.5 to 3.0 mm, particularly preferably of 1.5 mm. When only a filter frit is used, in particular having a surface coating consisting of fluorocarbons and/or fluorsilanes, a support plate is not necessary as the filter frit generally provides sufficient mechanical stability.

It may further be provided that the filter layer comprises a liquid-permeable intermediate layer arranged between the filter membrane or the filter frit and the support plate. The intermediate layer functions, among other things, as a buffer layer during the manufacture of the inventive device in order to absorb excess mechanical pressure during assembly or also while the membrane or filter frit is being punched out. For example, a fiber filter, in particular a glass fiber filter or a silica gel layer, may be employed as an intermediate layer, where in accordance with DIN EN 1822-3 the retention capacity of the intermediate layer is in particular less than 20 μm, preferably between 0.1 to 10 μm. The intermediate layer has, for example, a thickness of between 0.5 to 2.0 mm, preferably of 1.3 mm.

The filter layer may have a total thickness of between 1.2 to 5.3 mm and independently thereof a diameter of from 5 to 15 mm.

According to a particularly preferred embodiment of the inventive device, the filter layer has a three-layered structure composed of (a) a filter membrane or a filter frit, (b) a fiber filter and (c) a support plate in the order listed, where the layer (a) represents the position facing toward the inlet port and (c) the position facing toward the outlet port.

The filter layer may further be characterized in that it exhibits a hydrostatic resistance of from 0.03 bar to 4.8 bar, in particular of from 1.1 bar to 1.8 bar in accordance with ASTM D751-06 (2011, sections 36 to 44).

The filter layer used according to the invention may further exhibit air permeability according to ASTM D737-4 (2012) of from 3 L/(min×cm$^2$×bar) to 113 L/(min×cm$^2$×bar), in particular of from 5.4 L/(min×cm$^2$×bar) to 37.8 L/(min×cm$^2$×bar).

The hollow body of the inventive device may in principle have any form known to the expert that is suitable for the named purpose. It may, for example, have a rectangular-, square-, oval-, or circular cross-section and a cylindrical-, conical- or any other suitable form. The hollow body typically has an essentially cylindrical form with a circular cross-section.

The inventive device can be implemented as a single, individually usable column. It may thereby in turn be provided that individual columns are combined in a column group within a suitable receiving plate, for example in the SBS plate format (Society of Biomolecular Screening), i.e. in a standard format of microtiter plates with a footprint of approximately 127×75 mm. The receiving plate has a corresponding number of intake sites into which the individual devices can be inserted. The receiving plate can be formed as a strip and, for example, accommodate 8 individual devices, or also 6 to 12 of such 8-fold groups.

It is also provided in the context of the present invention that several or a plurality of inventive devices are fixedly connected with each other, for example in the form of 8-well strips, or 6-12 of such 8-well strips in appropriate receiving plates (column holders) or as a 96-well plate in the SBS plate format.

In a preferred embodiment, the hollow body is tapered below the filter layer, expediently in a conical form, in the direction of the outlet port in order to ensure complete sample flow in the direction of the outlet port. The outlet port itself may in turn have a cylindrical section with a circular cross-sectional area.

The inventive device may comprise a protuberant edge for mechanical reinforcement in the area of the inlet port. The protuberant edge may also be used to insert the device into the centrifuge holder assembly, where the protuberant edge acts as a stop. The protuberant edge can further be used to fixedly arrange the device in a receiving plate.

The filter layer may be inserted and secured within the hollow body by any method known per se. It may, for example, be placed onto a carrier plate provided within the hollow body or on a circular protrusion formed within the hollow body and be clamped in place by means of a clamping ring or also welded. The filter layer is thereby expediently positioned within the hollow body in the region of the outlet port in order to provide the largest possible filling volume of the organic solvent and/or lysis agent.

The hollow body of the device is preferably composed of a plastic material, in particular selected from polyolefins, for example, polyolefins such as polyethylene or polypropylene, from bio-based plastics such as polyhydroxybutyric acid or polyacetates, polyamides such as nylon, polyimides, acetals, polyvinyl chloride, polytetrafluoroethylene, polyesters, polycarbonates, polymethyl(meth)acrylates, acrylonitrile butadiene styrene terpolymer (ABS), polystyrene or any mixtures and/or copolymers thereof.

The hollow body is expediently manufactured via injection molding or by other manufacturing methods for small plastic components that are known per se to the expert.

In a further embodiment of the inventive method the flow-through in step d) and/or f) is accomplished by centrifugation or by applying a pressure gradient between the inlet port and the outlet port. This can in particular be performed by applying negative pressure at the outlet port and/or applying positive pressure at the inlet port. Of the aforementioned methods, application of negative pressure at the outlet port is the typically preferred variant as this can be readily implemented in high throughput sampling procedures. In addition, in this configuration, it is not required for the hollow body to have a pressure-resistant configuration, which contributes to material savings.

In further embodiments of the inventive method, the paraffin is dissolved in step b) according to the optional step c) under heating, in particular under heating to a temperature of between 35 to 70° C., preferably at between 40 to 60° C. Heating promotes faster dissolution of the paraffin in the organic solvent, and modification of the sample material at moderate temperatures is largely excluded.

In a further development of the inventive method, the method step e) is performed under heating, in particular to a temperature of from 25 to 100° C. for a period of 20 minutes to 16 hours, preferably of from 37 to 80° C. Heating accelerates sample lysis or enables more complete lysis, allowing the biomolecules to be isolated from the biological sample to be released more rapidly, or as quantitatively as possible. The duration of lysis depends on the temperature and also on the nature of the sample to be lysed. The expert can determine the appropriate duration with a few experiments.

In an advantageous embodiment, the organic solvent used in step b) is a so-called Paraffin Dissolver, as described in EP 2 270 151 B1, the contents of which are hereby completely incorporated in the present application by reference. The organic solvent is typically a non-hydro miscible solvent. The solvent is, for example, selected from aromatic hydrocarbon compounds having 6 to 30 carbon atoms, aliphatic hydrocarbon compounds having 10 to 30 carbon atoms, alkane- or alkene acids having 2 to 20 carbon atoms and derivatives thereof, aromatic or aliphatic alcohols having 6 to 12 carbon atoms and mixtures thereof, in particular of alkanes or alkenes.

Particularly suitable are linear hydrocarbon compounds having 9 to 15 carbon atoms, in particular having 12 to 15 carbon atoms or mixtures thereof. In particular, the aforementioned linear hydrocarbons are saturated or monounsaturated. These include, for example, n-nonane, n-decane, n-undecane, n-dodecane, n-tridecane and particularly preferably n-tetradecane, n-pentadecane and n-pentadecene. Technical solvents, such as biodiesel, diesel- or heating oil, thin paraffin liquid, white oil, petroleum, kerosene or Sinarol may also be employed. Sinarol is a $C_{14}$-$C_{19}$ mixture of hydrocarbons having a boiling point range of between 250° C.-330° C.

In addition, alkane- or alkene acids having 2 to 20, in particular 6 to 18 carbon atoms, and derivatives thereof, aromatic- or aliphatic alcohols having 6 to 12 carbon atoms may be employed. Mixtures of all the aforementioned substances are also possible. Examples of suitable alkane acids are octanoic-, nonanoic- or decanoic acid.

The aliphatic hydrocarbon compounds may be linear, branched, cyclic, saturated or unsaturated or mixtures thereof. Provided aromatic hydrocarbon compounds having aliphatic substituents are employed, these may also be linear, branched, cyclic, saturated or unsaturated. Examples of suitable cyclic- or aromatic hydrocarbons are pinene and limonene on the one hand, and xylene and Cymol on the other.

The aromatic and/or aliphatic hydrocarbon compounds may also carry heteroatoms, such as sulfur, nitrogen, oxygen, fluorine, chlorine, bromine and/or iodine groups.

Preferred alkane- or alkene acid derivatives are their esters, in particular their alkyl esters of linear carboxylic acids and linear alcohols, having one to 14 carbon atoms respectively, where the esters in particular contain 5 to 20 carbon atoms. For example, they can be acetic acid butyl esters, propionic acid ethyl ester, propionic acid pentyl ester, propionic acid octyl ester, propionic acid decyl ester, butyric acid decyl ester, pentylic acid octyl ester, octylic acid hexyl ester, octylic acid octyl ester, decylic acid butyl ester and dodecylic acid butyl ester.

Saturated and/or branched organic acid esters are further suitable, such as octyl acid isoamyl ester or also esters of polyvalent organic acids, such as acetyl-tributyl citrate, adipic acid diethyl ester or maleic acid diethyl ester.

Expediently, the solvent has a boiling point at normal pressure of at least 150° C., in particular of at least 160° C. This prevents the added organic solvent from evaporating too rapidly during the procedure, in particular during heating, leaving behind undissolved paraffin. Evaporation of the organic solvent can also cause an odor nuisance or even health impairment. Solvent vapors are furthermore often highly flammable. The selection of a solvent with a relatively high boiling point decreases its gaseous release at a given temperature, which reduces the fire hazard. The low vapor pressure of such solvents also allows to temporarily close the sample tube without the threat of it bursting when heated.

To further improve the safety of handling solvents, solvents that are not miscible with water are employed that have a flash-point of at least 40° C., in particular of at least 50° C., preferably of at least 60° C., more preferably of at least 70° C. or even of at least 80° C. Such solvents are, for example, acetyl-tributyl citrate, adipinic acid diethyl ester, decanole, malonic acid diethyl ester, benzyl alcohol or mixtures thereof. Also preferred are n-dodecane, n-tetradecane, n-pentadecane, n-pentadecene, biodiesel, Sinarol or mixtures thereof.

In a particularly preferred embodiment of the inventive method, the solvent used in step b) has a $K_{OW}$ value (n-octanol-water partition coefficient) of at least 4.0, in particular of at least 5.0 or of at least 6.0. Solvents with a $K_{OW}$ value of ≥5.0 are, for example, n-nonane, n-decane, n-undecane, n-dodecane, n-tridecane, n-tetradecane, n-pentadecane, and the corresponding alkenes, in particular n-pentadecene.

The isolation of biomolecules from the aqueous phase can be performed as described above, for example, via deposition of biomolecules to a solid phase, optionally followed by one or more wash steps. Suitable solid phases are, for example, organic polymer particles and/or mineral carrier materials such as quartz fibers, silica gel, glass, aluminum oxide, zeolites, titanium dioxide, and/or zirconium oxide. These carriers may be present in particulate form, in particular in form of magnetic- and/or magnetizable particles, in particular in form of magnetic beads. The carrier may further be employed as fibers, sponges, foams, in particular in form of frits or membranes. In a preferred configuration, the solid phase is configured as a chromatography column. The solid phase can thereby represent a column packing and/or a membrane, where in particular the aforementioned organic polymer particles and/or mineral carrier materials are employed.

High-salt buffers and/or high-content alcohols may be used as wash solutions in the aforementioned wash steps. High-content alcohols are understood as alcohols having an alcohol content of, for example, 70 or 80 vol.–%. Suitable alcohols of this type are, for example, ethanol, n-/isopropanol, butanols or mixtures of said alcohols. The high-content alcohols may also contain small amounts of buffer substances.

The association of the biomolecules to the solid phase can be achieved by bringing the aqueous phase in contact with the solid phase. If silica-based materials are used as a solid phase, prior addition of a chaotropic salt to the aqueous phase and/or an alcohol having one to four carbon atoms, for example, methanol or ethanol, can be made to improve the binding conditions.

When magnetic- or magnetizable particles are used, in particular magnetic beads, they can also be directly added to the aqueous phase. Together with the particles, a chaotropic salt and/or an alcohol having up to four carbon atoms can be added to the aqueous phase in order to improve the binding conditions, and/or the separation of the loaded particles may be supported by centrifugation or magnetic separation.

A further object of the present invention relates to a kit for extraction of nucleic acids from a formalin-fixed and paraffin-embedded sample comprising an inventive device and a user manual for performing the inventive method, and an organic solvent and/or at least one lysis agent.

BRIEF DESCRIPTION OF THE DRAWINGS

The following FIG. 1 to FIG. 9 and exemplary embodiments describe the present invention in more detail. The figures show FIG. 1 the schematic construction of an inventive device in side sectional view, FIG. 2 a second embodiment of the inventive device as a 96-well filter plate, FIG. 3 a third embodiment of the inventive device as a 8-well filter strip, FIG. 4 the graphical representation of the inventive method as a flow diagram, FIG. 5 a result of a nucleic acid purification using the inventive filter for three different samples in comparison with the NucleoSpin FFPE DNA XS Kit, FIG. 6-FIG. 8 presentation of the progression of the qPCR analysis with the Quantifiler Human DNA Quantification Kit using samples listed in Table 2, FIG. 9 presentation of the obtained Ct values, FIG. 10 application data for various FFPE preparations following de-paraffinization and sample lysis according to the invention.

Figure 1:
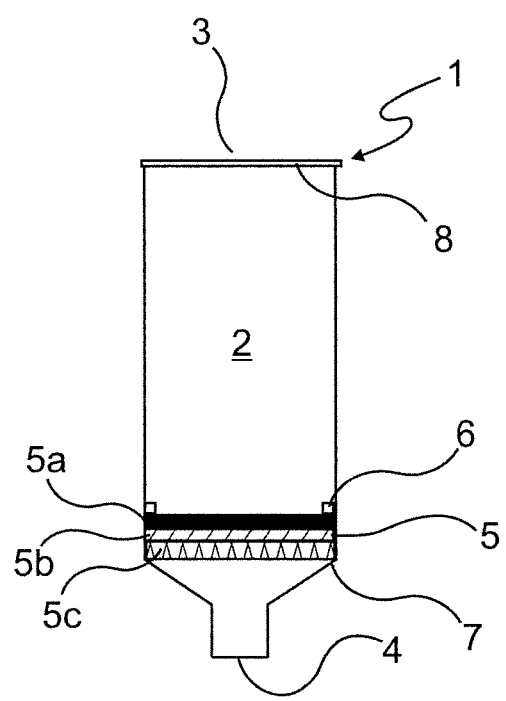
FIG. 1 shows an inventive device 1 in side sectional view. The device 1 comprises a hollow body 2 having an inlet port 3 and an outlet port 4. A filter layer 5 is clamped by means of a tensioning ring 6 inside the hollow body 2 against the tapering section 7 of the hollow body 2 as bottom restriction. The filter layer 5 is composed of three layers and comprises a polyether sulfone membrane 5a in the direction facing the inlet port 3, a glass fiber filter intermediate layer 5b, and a frit of hydrophobic polyethylene as supporting layer 5c. The polyether sulfone membrane 5a and thus also the filter layer 5 have an oil repellency of grade 8 according to the test method AATCC-118 (1997). The hollow body is composed of polypropylene and comprises a reinforcing protuberant edge 8.
Figure 2:
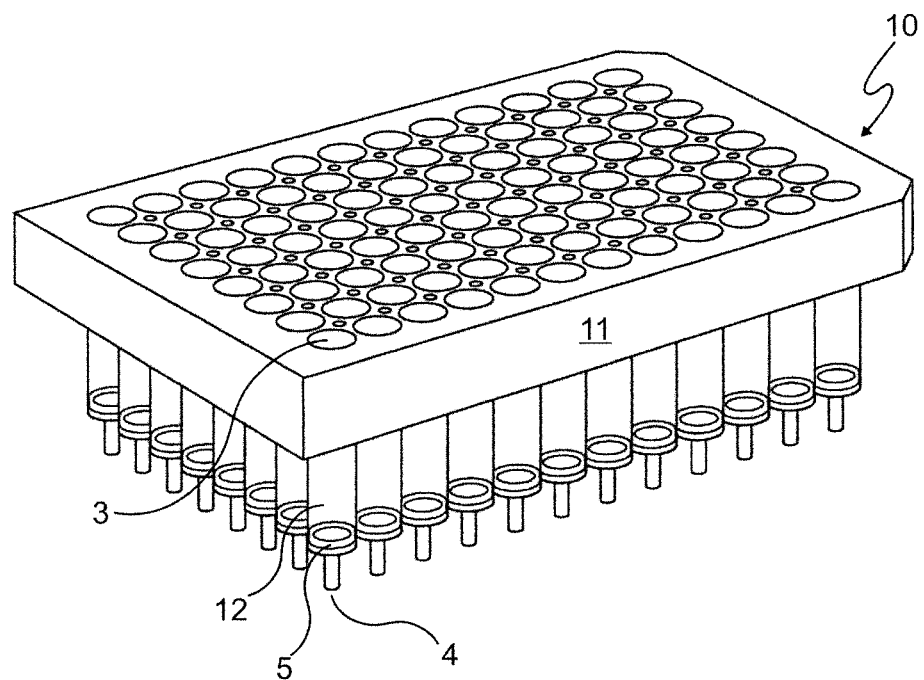
In FIG. 2 a second embodiment of an inventive device 10 is shown in which 96 individual hollow bodies 12 are arranged on a base plate 11. Each of the hollow bodies 12 has essentially the same structure as the body of the device 1 shown in FIG. 1 with the exception that the hollow body 12 does not comprise a protuberant edge 8 as the hollow bodies 12 form an integral structural component with the base plate 11, which is, for example, produced via an injection molding process using polypropylene or polyethylene. Each hollow body 12 has an inlet port 3 and an outlet port 4 and contains a filter layer 5 with the same three-layered structure as described above in FIG. 1.
Figure 3:
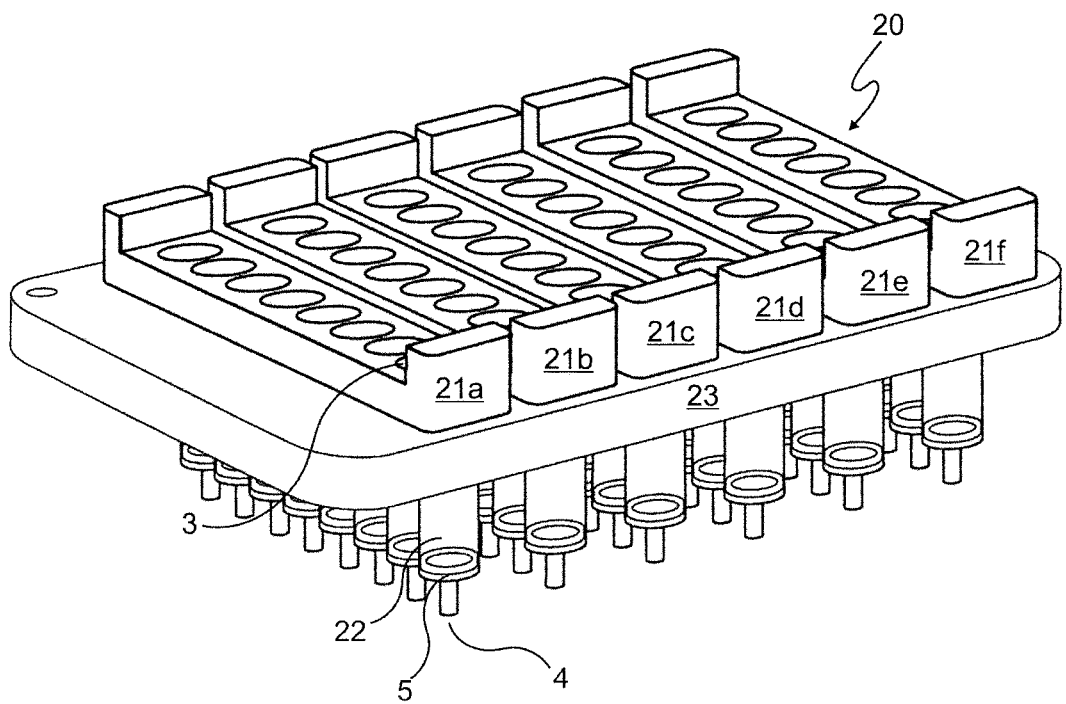
FIG. 3 shows a third embodiment of an inventive device 20 in which 8 individual hollow bodies 22 are arranged on a strip-shaped retainer 21a-21f. The six strip-shaped retainers 21a-21f are inserted in a base plate 23, which comprises a total of 48 openings to accommodate the hollow bodies 22.

Each of the hollow bodies 22 has essentially the same structure as the structure of the device 1 shown in FIG. 1 with the exception that the hollow bodies 22 do not comprise an upper protuberant edge 8. A sequence of eight hollow bodies 22 each form an integral structural component with the strip-shaped retainers 21a to 21f, which, for example, is produced via an injection molding process using polypropylene or polyethylene. Each hollow body 22 comprises an inlet port 3 and an outlet port 4 and contains a filter layer 5 with the same three-layer structure as described above in FIG. 1.

Figure 4:
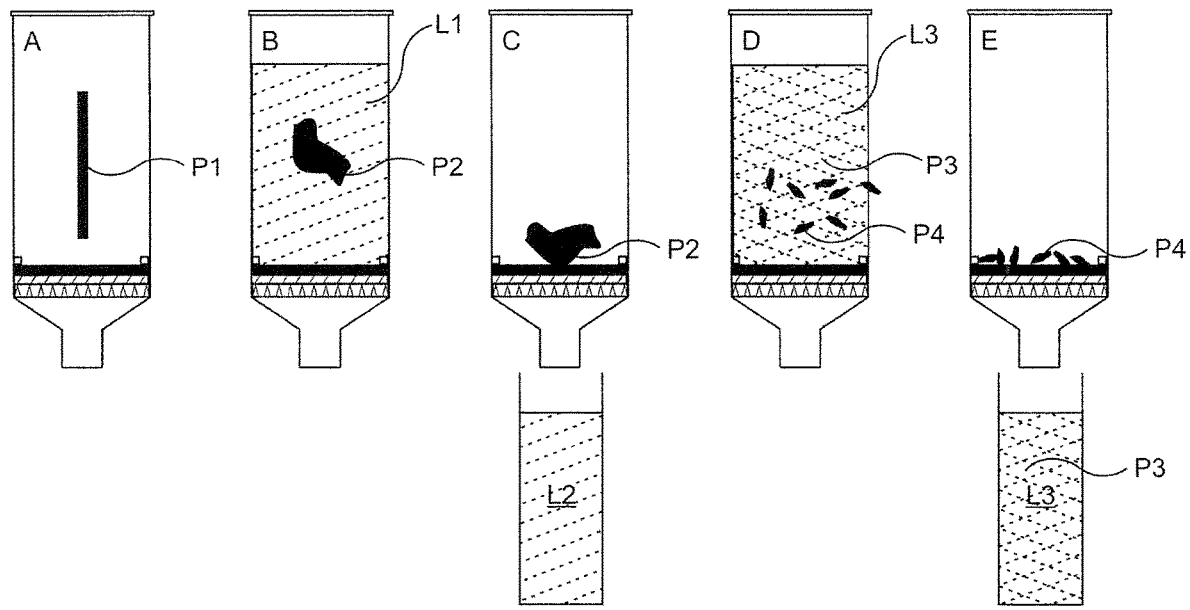

The exemplary sequence of the inventive method is shown in FIG. 4 and comprises the following steps:

(A) One or more microtome sections (up to 20 μm) or punches of a formalin-fixed paraffin-embedded (FFPE) tissue sample P are introduced into the column 1.

(B) The sample P1 is completely covered with Paraffin Dissolver L1, depending on the column dimension with up to 800 μL. The solution is heated to 60° C. under shaking in up to 5 minutes. The paraffin thereby dissolves in the Paraffin Dissolver L1 and the paraffin-freed sample P2 is released.

(C) The dissolved paraffin is forced through the filter layer 5 by application of a pressure gradient or by centrifugation and the flow-through L2 is discarded.

(D) A solution L3 comprised of a lysis buffer and proteolytic enzymes is added to the retained sample P2 and incubated e.g. for 60 minutes at e.g. 56° C. under shaking. The nucleic acid-containing components of the sample P3 thereby go into solution while the insoluble components of the sample P4 remain in the sample.

(E) The dissolved nucleic acid-containing components of the sample P3 are forced through the filter layer 5 together with the solution L3 and collected in a tube. The insoluble components of the sample P4 are completely retained by the filter layer 5.

De-crosslinking agents can be additionally added to the lysed sample and incubated at up to 90° C. The collected sample can subsequently be subjected to conventional isolation of nucleic acid-containing components from the solution P3/L3, which is not shown here. The solution P3/L3 is thereby treated with a binding reagent and bound to a silica membrane or to magnetic particles. The bound nucleic acids are washed with special solutions and dried. The nucleic acids are eluted from the column material or from the magnetic particles by a buffer or by water.

The only manual step required is the introduction of the samples. The subsequent steps can generally be performed in an automated procedure in less than 4 hours for 96 samples. Depending on the type and configuration of the robot used, 96 samples can be processed in parallel, where sequential processing of several plates is also possible.

Chemicals used:

Reagent sets customary in the trade for purification of nucleic acids, e.g., NucleoSpin Tissue Macherey-Nagel, REF 740952.50 or NucleoMag Tissue, Macherey-Nagel REF 744300.1 1 or similar commercially available reagent sets.

Detailed list of components of the reagent sets:

Tissue lysis buffer: Commercially known aqueous buffer solutions, e.g. NucleoSpin Buffer T1 Macherey-Nagel, REF 740940.25 or analogous buffer solutions consisting of buffer salts, such as phosphate, Tris (tris(hydroxymethyl)aminomethane), sodium chloride, guanidinium salts with or without anionic detergents such as sodium lauryl sulfate.

De-crosslinking buffer: Aqueous buffer solution customary in the trade, such as buffer D-link, Macherey-Nagel REF 740979.30 or analogous solutions consisting of ammonium salts, or alkylamines.

Buffer for the purification of DNA via spin columns (NucleoSpin)

Nucleic acid binding buffer: Aqueous buffer solutions customary in the trade, e.g. NucleoSpin Buffer BQ1, Macherey-Nagel, REF 740923 or analogous buffer solutions consisting of buffer salts, such as phosphate, Tris (tris(hydroxymethyl)aminomethane), guanidinium salts (36-50% by weight), polyoxyethlyene(20) sorbitan monolaurate (10-33% by weight) and ethanol (50% by weight).

Nucleic acid Washing Buffer: Aqueous buffer solutions customary in the trade, e.g. NucleoSpin Buffer BW, Macherey-Nagel, REF 740922 or analogous buffer solutions consisting of guanidinium salts (36-50% by weight) and 2-propanol (20-50% by weight).

Alcoholic wash solutions customary in the trade, e.g. NucleoSpin Buffer B5, Macherey-Nagel REF 740921 or analogous wash solutions consisting of 80% by weight ethanol.

Nucleic acid Elution Buffers: Buffer solutions customary in the trade e.g. NucleoSpin Buffer BE Macherey-Nagel REF 740306.100 consisting of 5 mm Tris (tris(hydroxymethyl)-aminomethane) pH 8.5

Nucleic acid Binding Columns: Binding columns customary in the trade, e.g. NucleoSpin Tissue Binding Columns Macherey-Nagel REF 740952.250S or analogous spin columns filled with glass fiber filter papers for binding DNA.

Buffer for DNA purification by means of magnetic beads (NucleoMag)

Nucleic acid Binding Buffer: Aqueous buffer solutions customary in the trade, e.g. NucleoMag Buffer MB2, Macherey-Nagel REF 744851.80 consisting of sodium perchlorate (20-40% by weight, ethanol 35-55% by weight).

Nucleic acid Wash Buffer: Aqueous buffer solutions customary in the trade, e.g. NucleoMag Buffer MB3, MB4, Macherey-Nagel REF 744851.80, 744853.75 consisting of sodium perchlorate (20-40% by weight, ethanol 35-55% by weight and an aqueous alcohol solution (80% ethanol by weight in water)

Nucleic acid Elution Buffer: Buffer solutions customary in the trade, e.g. NucleoMag Buffer MB6 Macherey-Nagel REF 744855.300 consisting of 5 mM Tris (tris(hydroxymethyl)aminomethane) pH 8.5

Magnetic beads for purification of nucleic acids: Magnetic particles customary in the trade, which allow reversible binding of nucleic acids using the above-described buffer conditions e.g., B-beads, Macherey-Nagel REF 744503.12)

Paraffin Dissolver: Paraffin Dissolver customary in the trade of Macherey-Nagel (REF 740968.25) or pentadecane The following table 1 summarizes the protocols used for the different sample purifications. The "NucleoSpin® FFPE DNA XS" as comparison protocol thereby represents a commercially available kit from Macherey-Nagel (Duren, Germany) for processing and isolating single FFPE-samples. "NucleoSpin 96 FFPE Filter" and "NucleoMag 96 FFPE Filter" are inventive embodiments, in which the inventive device was used for separating the paraffin and lysing the sample, where the further processing and isolation of the DNA is performed in an automated manner with the commercially available kits NucleoSpin® 96 and NucleoMag® 96 (both Macherey-Nagel, Duren, Germany) in a 96 sample format. Paraffin removal and sample lysis are identical in the variants of the invention.

TABLE 1

Protocols for different sample preparations

| Procedure | NucleoSpin FFPE DNA XS | NucleoSpin 96 FFPE Filter | NucleoMag 96 FFPE Filter |
|---|---|---|---|
| Paraffin-removal | 400 µL Paraffin Dissolver<br>60° C.<br>3 minutes<br>Allow sample to cool<br>5 minutes | 600 µL Paraffin Dissolver<br>60° C.<br>5 minutes<br>Suction off Paraffin Dissolver<br>−600 mbar<br>5 minutes | 600 µL Paraffin Dissolver<br>60° C.<br>5 minutes<br>Suction off Paraffin Dissolver<br>−600 mbar<br>5 minutes |
| Sample lysis | 100 µL FL<br>11000 xg<br>1 minute<br>10 µL Proteinase K<br>11000 xg<br>1 minute<br>20-25° C.<br>Incubation >8 hours | 360 µL T1<br>40 µL Proteinase K<br>56° C.<br>Incubation 1-3 hours | 360 µL T1<br>40 µL Proteinase K<br>56° C.<br>Incubation 1-3 hours |
| Clarifying lysate,<br>de-crosslinking & binding | 100 µL D-Link<br>90° C.<br>30 minutes<br>200 µL ethanol 98%<br>1000 xg<br>1 second<br>Transfer XS-column<br>2000 xg<br>30 seconds | −600 mbar<br>5 minutes<br>200 µL D-Link<br>90° C.<br>30 minutes<br>1200 µL NucleoSpin Binding Buffer<br>Transfer Binding plate (900 µL)<br>−400 mbar<br>5 minutes<br>Transfer Binding plate (900 µL)<br>−400 mbar<br>5 minutes | −600 mbar<br>5 minutes<br>200 µL D-Link<br>90° C.<br>30 minutes<br>20 µL B-Beads<br>600 µL NucleoSpin Binding Buffer |
| Wash | 400 µL B5<br>11000 xg<br>30 seconds<br>400 µL B5<br>11000 xg<br>2 minutes | 600 µL NucleoSpin Wash Buffer 1<br>−600 mbar<br>2 minutes<br>900 µL NucleoSpin Wash Buffer 2<br>−600 mbar<br>2 minutes<br>900 µL NucleoSpin Wash Buffer 2<br>−600 mbar<br>2 minutes<br>−800 mbar<br>10 minutes | 600 µL NucleoSpin Wash Buffer 1<br>5 minutes resuspension<br>5 minutes separation<br>600 µL NucleoMag Wash Buffer 2<br>5 minutes resuspension<br>5 minutes separation<br>600 µL ethanol 80%<br>5 minutes resuspension<br>5 minutes separation<br>10 minutes drying beads |

TABLE 1-continued

Protocols for different sample preparations

| Procedure | NucleoSpin FFPE DNA XS | NucleoSpin 96 FFPE Filter | NucleoMag 96 FFPE Filter |
|---|---|---|---|
| Elution | 100 μL BE<br>11000 xg<br>1 minute | 150 μl Elution Buffer<br>−400 mbar<br>2 minutes | 100 μl Elution Buffer<br>5 minutes resuspension<br>5 minutes separation |

The analyzed samples are listed in Table 2, where five 20 μm microtome sections each of the following human tissues with approximately calculated tissue volumes:

TABLE 2 analyzed samples

| | Tissue | Organism | Amount mm$^3$ |
|---|---|---|---|
| 1 | Stomach | Human | 7.7 |
| 2 | Lung Cancer | Human | 3.1 |
| 3 | Skin | Human | 2.8 |

Superior results in terms of yield and purity were obtained with the FFPE Filter method in comparison to a normal NucleoSpin DNA FFPE XS Kit. In particular, the higher purity is likely the result of filtration of non-lysed residues and the complete removal of paraffin prior to binding.

Figure 5:
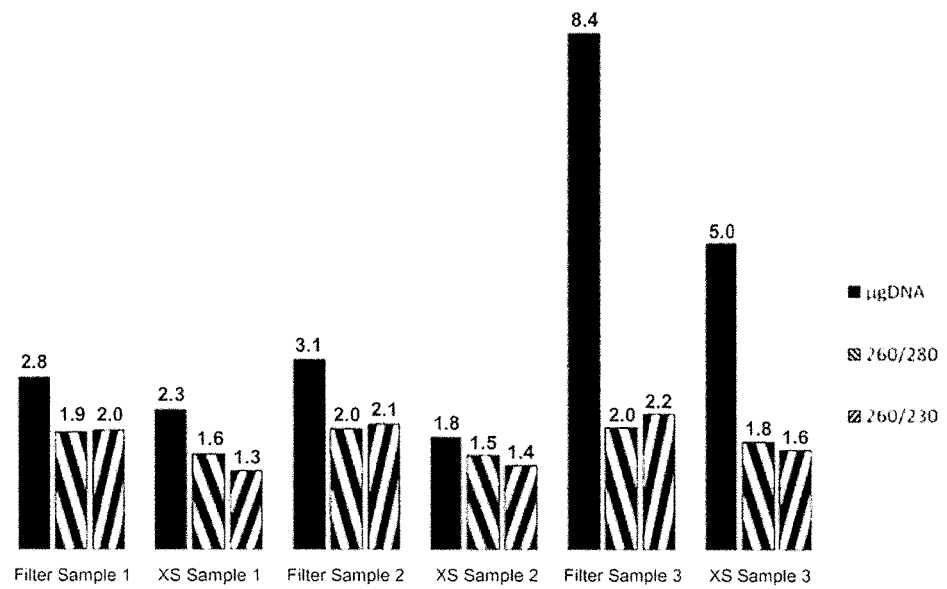

The results of a nucleic acid purification with the inventive filter for three different samples (see Table 2) are shown in FIG. 5 in comparison with the NucleoSpin FFPE DNA XS Kit with photometrically determined nucleic acid concentrations and purity values presented as absorption ratios at the indicated wavelengths.

Figure 6:
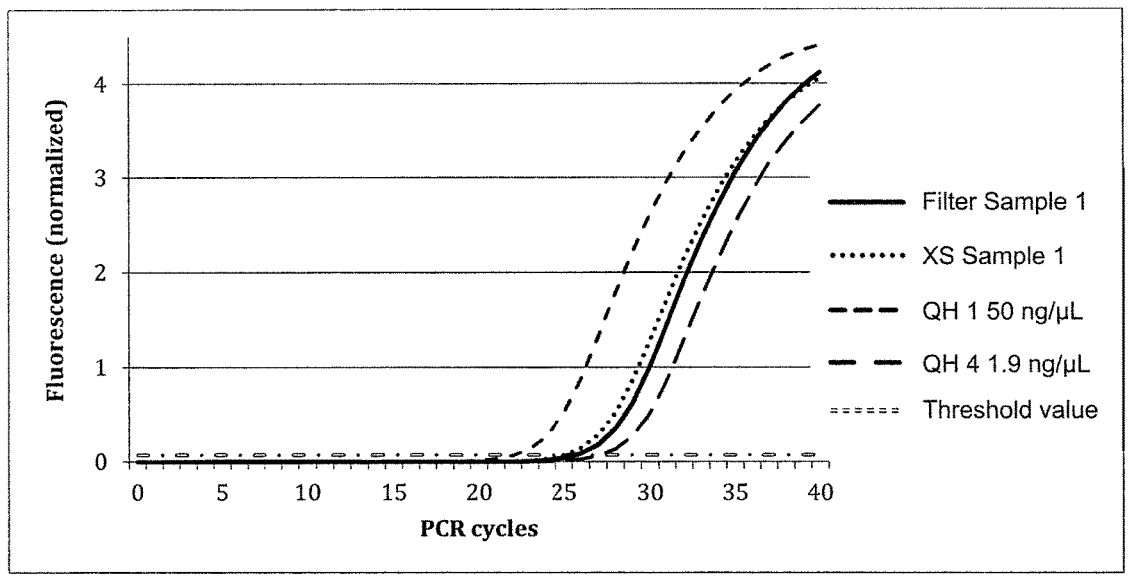
Figure 7:
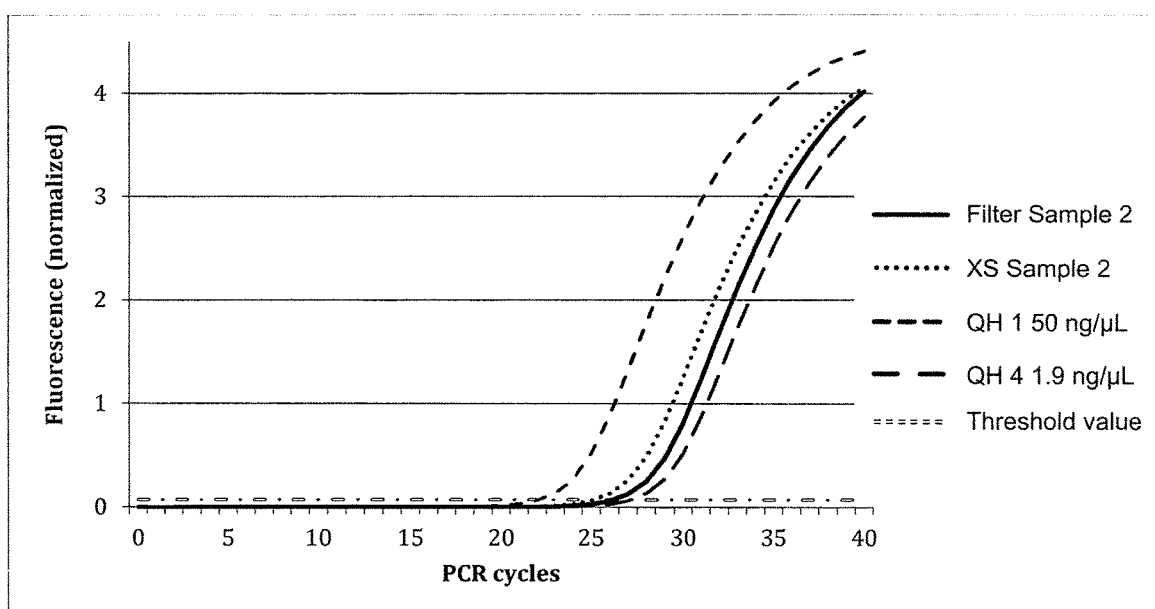
Figure 8:
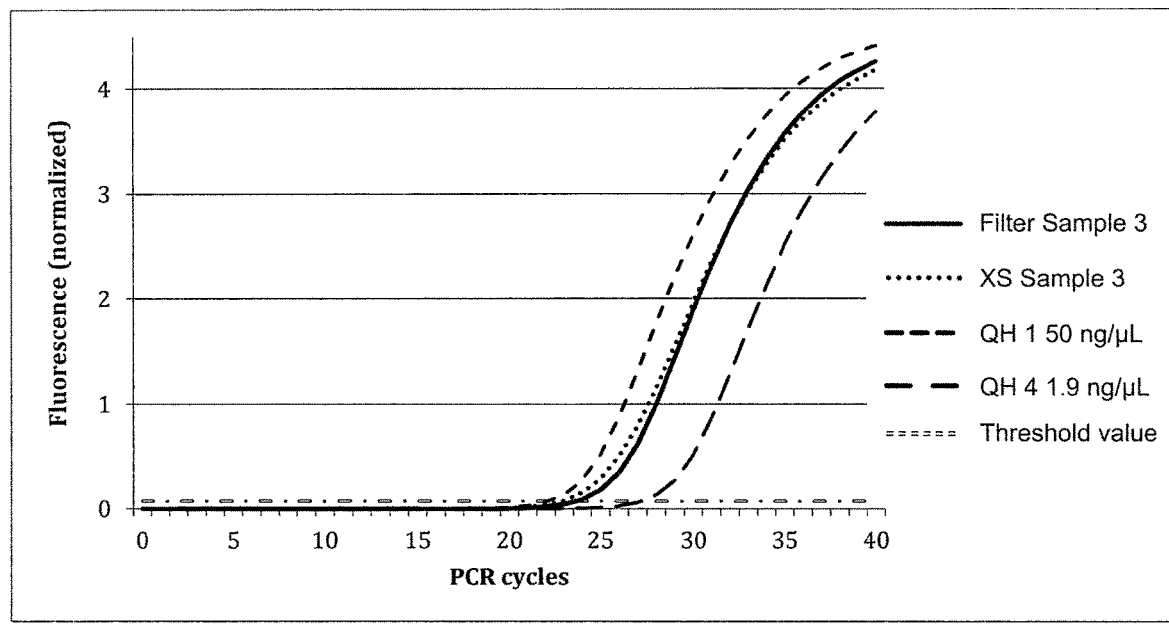

FIGS. 6-8 shows the progression of the qPCR analysis of the samples listed in Table 2 with the Quantifiler Human DNA Quantification Kit (Life Technologies, catalog number 4343895) as well as the progression of the DNA-standards used at 1.9 ng/μL and 50 ng/μL.

Figure 9:
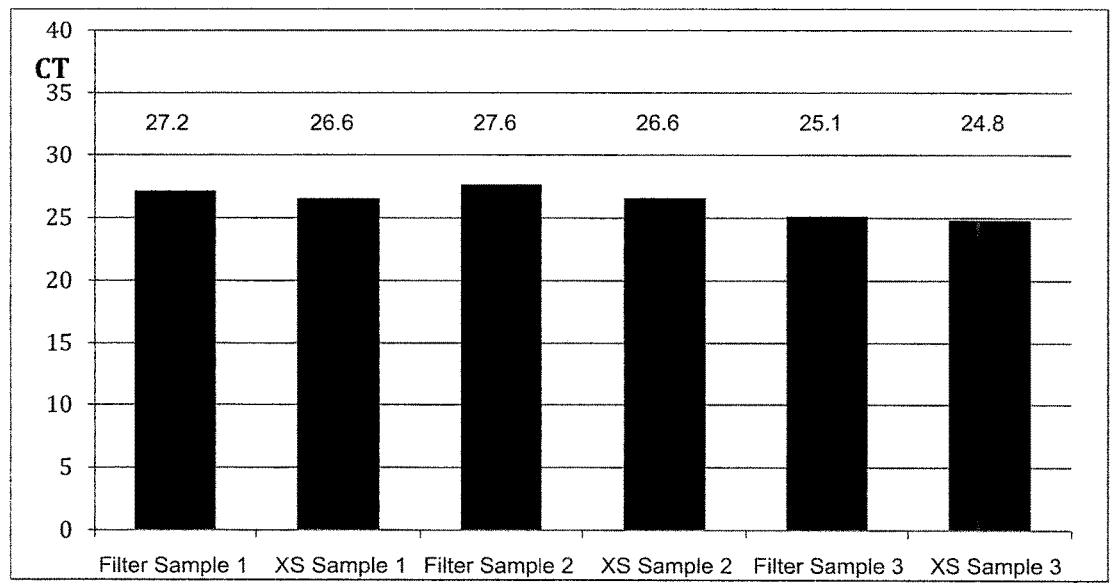

The obtained CT values are shown in FIG. 9 (cycle threshold, indicating PCR-cycle in which the fluorescence threshold value is exceeded). Lower CT values indicate a higher concentration of DNA. As is apparent from FIG. 9, the yield and quality of the DNA purified with the inventive device is comparable with the commercially available single column kit. The inventive device therefore provides advantages not only with respect to throughput and handling, but is able to deliver the same performance as the kit for processing individual samples.

The following experiments relate to the extraction of the clarified lysate with magnetic beads (NucleoMag). To this end, the nucleic acids contained in solution L3/P3 are separated according to the protocol in Table 1. The following samples were examined:

TABLE 3 analyzed samples

| | Tissue | Organism | Amount mm$^3$ |
|---|---|---|---|
| 1 | Tongue | Human | 0.96 |
| 2 | Colon | Human | 0.54 |
| 3 | Ileum | Human | 3 |
| 4 | Melanoma | Human | 5.5 |
| 5 | Spleen | Human | 3 |
| 6 | Liver carcinoma | Human | 8.16 |

Figure 10:
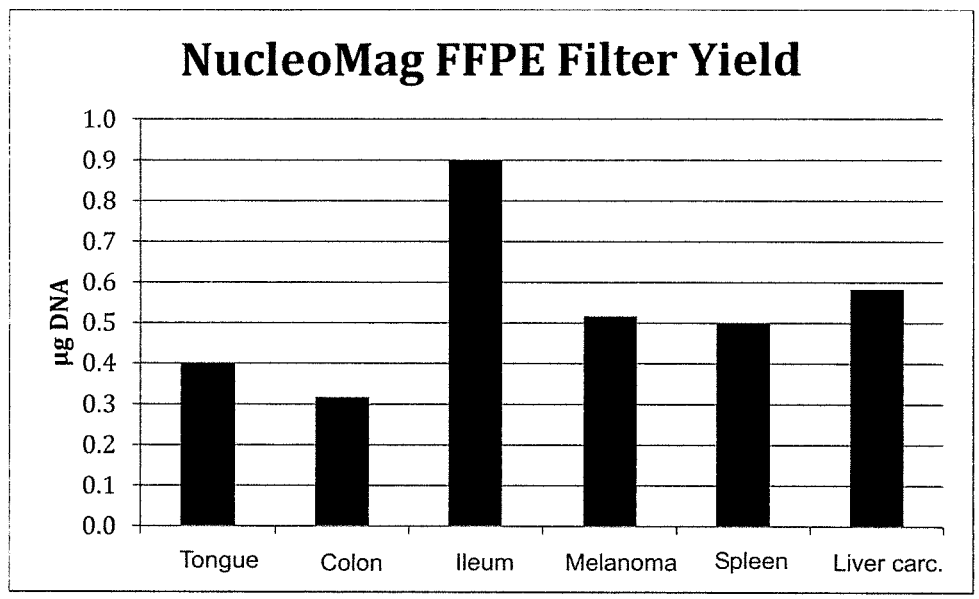

FIG. 10 summarizes the experimental data of the various FFPE preparations of human tissues of Table 3 following de-paraffinization and sample lysis according to the method of the invention. The purification of the nucleic acids was performed using the NucleoMag method (see Table 1).

Comparison of different filter membranes:

The following membranes were examined to compare the effect of the filter material on sample preparation and yield:

TABLE 4

Comparison of different membranes; *Lpm (liters per minute)/3.7 cm$^2$ 0.9 bar; **Lpm (liters per minute)/3.7 cm$^2$ 0.34 bar

| No. | Manufacturer | Description | Material | Pore size (μm) | Air permeability L/(min × cm$^2$ × bar) | Incoming water-pressure (bar) | Oil repellency (AATCC), 118-1997 |
|---|---|---|---|---|---|---|---|
| 1 | Pall | Supor 200R | PES | 0.2 | ≥6* | ≥1.8 | grade 8 |
| 2 | Pall | Supor 450R | PES | 0.45 | ≥28* | ≥1.38 | grade 8 |
| 3 | Pall | Versapor 200R | Acrylic copolymer | 0.2 | ≥4.7* | ≥1.7 | grade 8 |
| 4 | Pall | Versapor 450R | Acrylic copolymer | 0.45 | ≥16.6* | ≥1.1 | grade 8 |
| 5 | Pall | Versapor 1200R | Acrylic copolymer | 1.2 | 37.8-69.5** | ≥0.41 | grade 8 |
| 6 (comp.) | Pall | Supor 5000 | PES | 5 | ≥423 | 0.14-0.7 | grade 0 |
| 7 | Pall | Versapor 5000R | Acrylic copolymer | 5 | ≥88 | ≥0.14 | grade 8 |
| 8 | Pall | Versapor 10000R | Acrylic copolymer | 10 | ≥113 | ≥0.03 | grade 8 |
| 9 | Sabeu | Traketech PET23B K100 D0,4 hl PET 60 | PET | 0.4 | 5.8 +/− 0.4 | ≥2.7 | grade 6 |

TABLE 4-continued

Comparison of different membranes; *Lpm (liters per minute)/3.7 cm² 0.9 bar; **Lpm (liters per minute)/3.7 cm² 0.34 bar

| No. | Manufacturer | Description | Material | Pore size (μm) | Air permeability L/(min × cm² × bar) | Incoming water-pressure (bar) | Oil repellency (AATCC), 118-1997) |
|---|---|---|---|---|---|---|---|
| 10 | Sabeu | Traketech PET23B K320 D0,22 hl PET 60 | PET | 0.2 | 3.0 +/− 0.5 | ≥4.2 | grade 6 |

The aforementioned inventive filter materials 1 to 5 and 7 to 10, and the comparator filter material 6 were each inserted as a filter membrane 5a in a device such as shown in FIG. 1 with identical layers 5b and 5c, respectively according to FIG. 1. The letter "R" following the description designates oil repellency modification. One section each of a sample (20 μm microtome section, mammalian organ) was introduced into a cavity of the inventive device. 400 μL of Paraffin Dissolver pre-heated to 60° C. was added and the plate shaken for 3 min at 60° C. at 500 rpm on an Eppendorf Thermomixer Comfort. The Paraffin Dissolver was subsequently transferred by centrifugation (1 min 5000×g) into a capture plate placed underneath.

To the paraffin-freed tissue fragments that were retained on the filter layer was added 200 μL of a lysis buffer (Buffer T1, Macherey-Nagel) and 25 μL proteinase K solution (25 mg/mL). The reaction mixture was incubated for 3 h at 56° C. under shaking. The tissue lysate was subsequently transferred by centrifugation (1 min 5000×g) into a capture plate placed underneath.

The further purification of the DNA obtained is performed according to the following protocol:

100 μL D-Link Buffer (Macherey-Nagel) was added to the collected lysates and the lysate incubated for 30 min at 90° C. The samples were then cooled down to room temperature.

For further purification, 20 μL magnetic beads and 600 μL Binding Buffer MB2 (Macherey-Nagel) were added to the sample. Following a 5 min incubation under shaking the beads were separated using a magnet separator and the supernatant drawn off and discarded.

The magnetic beads were washed once with 600 μL Wash Buffer MB4 (Macherey-Nagel) and 80% ethanol, then air-dried for 10 minutes.

The purified DNA was eluted from the magnetic beads in 100 μL Elution Buffer MB6 (Macherey-Nagel).

All membranes used other than the untreated comparator membrane (Pall Supor 5000, No. 6) completely retain the Paraffin Dissolver and the lysis buffer during the incubation step.

The amount of extracted and amplifiable DNA was determined by means of quantitative real-time PCR. To this end, a 161 by fragment of the GAPDH gene was selected as target. Lower CT values (=cycle threshold, fluorescence of a DNA-intercalating dye) reflect a higher DNA yield compared with higher CT values.

The results of the CT values (amplification of a GAPDH-gene) are summarized in Table 5 for mouse liver samples and in Table 6 for mouse lung:

TABLE 5

Comparison of different filter materials for DNA extraction from mouse liver

| CT VALUES | 1 | 2 | 3 | 4 | 5 | 6 comp. | 7 | 8 | 9 | 10 |
|---|---|---|---|---|---|---|---|---|---|---|
| — | | | | | Mouse liver | | | | | |
| — | Versapor | Versapor | Versapor | Versapor | Versapor | Supor | Supor | Supor | Sabeu | Sabeu |
| — | 10000R | 5000R | 1200R | 450R | 200R | 5000 | 450R | 200R | 63390 | 63090 |
| A | 22.46 | 20.91 | 21.74 | 21.71 | 20.63 | 23.92 | 21.73 | 20.89 | 21.88 | 22.03 |
| B | 21.98 | 22.54 | 22.61 | 22 | 22.12 | 23.98 | 22.25 | 21.92 | 22.81 | 20.18 |
| Average | 22.2 | 21.7 | 22.2 | 21.9 | 21.4 | 24.0 | 22.0 | 21.4 | 22.3 | 21.1 |
| Std dev | 0.34 | 1.15 | 0.62 | 0.21 | 1.05 | 0.04 | 0.37 | 0.73 | 0.66 | 1.31 |

TABLE 6

Comparison of different filter materials for DNA extraction from mouse lung

| CT VALUES | 1 | 2 | 3 | 4 | 5 | 6 comp. | 7 | 8 | 9 | 10 |
|---|---|---|---|---|---|---|---|---|---|---|
| — | | | | | Mouse lung | | | | | |
| — | Versapor | Versapor | Versapor | Versapor | Versapor | Supor | Supor | Supor | Sabeu | Sabeu |
| — | 10000R | 5000R | 1200R | 450R | 200R | 5000 | 450R | 200R | 63390 | 63090 |
| A | 24.1 | 23.77 | 24.99 | 23.09 | 22.53 | 28.24 | 23.32 | 25.83 | 22.83 | 21.52 |
| B | 24.02 | 23.83 | 23.69 | 22.85 | 22.58 | 27.82 | 23.06 | 22.64 | 22.75 | 22.21 |
| Average | 24.1 | 23.8 | 24.3 | 23.0 | 22.6 | 28.0 | 23.2 | 24.2 | 22.8 | 21.9 |
| Std dev | 0.06 | 0.04 | 0.92 | 0.17 | 0.04 | 0.30 | 0.18 | 2.26 | 0.06 | 0.49 |

The results show that with all inventive membranes regardless of the pore size higher yields were obtained compared with the comparator membrane (No. 6). It is thereby important to consider that, because of the logarithmic nature of the CT values, a difference in the CT-value of 3.3 corresponds to a factor of 10 in terms of yield.

The invention claimed is:

1. A kit for extracting nucleic acids from a formalin-fixed and paraffin-embedded sample comprising a device for purifying nucleic acids from a formalin-fixed and paraffin-embedded sample comprising a hollow body having an inlet port and an outlet port and a filter layer arranged within the hollow body, wherein the filter layer has an oil repellency according to AATCC-118 (1997) of grade 6 to 8, a user manual, and an organic solvent, and optionally at least one lysis agent, and wherein the organic solvent used in step b) has a $K_{OW}$ value (n-octanol-water partition coefficient) of at least 4.0;

wherein the filter layer consists of a polyether sulfone membrane, a frit of hydrophobic polyethylene, and a glass fiber filter intermediate layer between the polyether sulfone membrane and the fit of hydrophobic polyethylene.

2. The kit according to claim 1, wherein the user manual contains a method for extracting nucleic acids from a formalin-fixed and paraffin-embedded sample, comprising the following steps:
    a) transferring a formalin-fixed and paraffin-embedded sample into the device through the inlet port of the device;
    b) covering the sample with an organic solvent and dissolving the paraffin in the organic solvent;
    c) optionally heating to a temperature of between 35 to 70° C.;
    d) passing the organic solvent and the paraffin dissolved therein through the filter layer in the direction of the outlet port of the device;
    e) introducing a solution containing at least one lysis agent through the inlet port of the device to the paraffin-purified sample following step d) and incubating, in particular at a temperature of between 25 to 100° C., for a time period of between 20 minutes to 16 hours;
    f) passing the solution containing the lysis agent and the lysed sample through the filter layer in the direction of the outlet port of the device and collecting said solution.

3. The kit according to claim 2, wherein the passing-through in step d) and/or f) is accomplished by centrifugation or by applying a pressure gradient between the inlet port and the outlet port, in particular by applying a negative pressure at the outlet port and/or applying a positive pressure at the inlet port.

4. The kit according to claim 1, wherein the average pore size of the polyether sulfone membrane and/or the frit of hydrophobic polyethylene according to DIN 66133 is less than 20 μm.

5. The kit according to claim 1, wherein the filter layer has an air permeability according to ASTM D737-4 of 3 L/(min×cm²×bar) to 113 L/(min×cm²×bar).

6. The kit according to claim 1, wherein the hollow body is constructed of a plastic material.

7. The kit according to claim 1, wherein the filter layer has a hydrostatic resistance of from 0.03 bar to 4.8 bar, in accordance with ASTM D751-06.

8. A kit for extracting nucleic acids from a formalin-fixed and paraffin-embedded sample comprising a device for purifying nucleic acids from a formalin-fixed and paraffin-embedded sample comprising a hollow body having an inlet port and an outlet port and a filter layer arranged within the hollow body, wherein the filter layer has an oil repellency according to AATCC-118 (1997) of at least grade 5, a user manual, and an organic solvent, and optionally at least one lysis agent, wherein the organic solvent has a $K_{OW}$ value (n-octanol-water partition coefficient) of at least 4.0; wherein the filter layer consists of a polyether sulfone membrane, a frit of hydrophobic polyethylene, and a glass fiber filter intermediate layer between the polyether sulfone membrane and the frit of hydrophobic polyethylene.

9. A kit for extracting nucleic acids from a formalin-fixed and paraffin-embedded sample comprising a device for purifying nucleic acids from a formalin-fixed and paraffin-embedded sample comprising a hollow body having an inlet port and an outlet port and a filter layer, arranged within the hollow body, wherein the filter layer has an oil repellency according to the AATCC-118 (1997) test method of at least grade 5;

wherein the filter layer consists of a polyether sulfone membrane, a frit of hydrophobic polyethylene, and a glass fiber filter intermediate layer between the polyether sulfone membrane and the frit of hydrophobic polyethylene, a user manual, and an organic solvent, and optionally at least one lysis agent, wherein the user manual contains a method for extracting nucleic acids from a formalin-fixed and paraffin-embedded sample, comprising the following steps:

a) transferring a formalin-fixed and paraffin-embedded sample into the device through the inlet port of the device;

b) covering the sample with an organic solvent having a $K_{OW}$ value (n-octanol-water partition coefficient) of at least 4.0 and dissolving the paraffin in the organic solvent;

c) optionally heating to a temperature of between 35 to 70° C.;

d) passing the organic solvent and the paraffin dissolved therein through the filter layer in the direction of the outlet port of the device;

e) introducing a solution containing at least one lysis agent through the inlet port of the device to the paraffin-purified sample following step d) and incubating, in particular at a temperature of between 25 to 100° C., for a time period of between 20 minutes to 16 hours;

passing the solution containing the lysis agent and the lysed sample through the filter layer in the direction of the outlet port of the device and collecting said solution.

* * * * *